June 2, 1959 J. M. LAPEYRE 2,888,709
MACHINE FOR SEPARATING SHRIMP FROM FISH AND DE-HEADING THE SHRIMP
Filed March 23, 1955 3 Sheets-Sheet 1
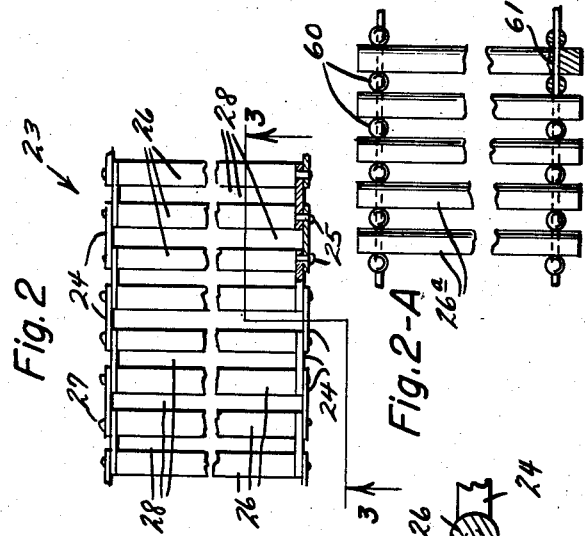
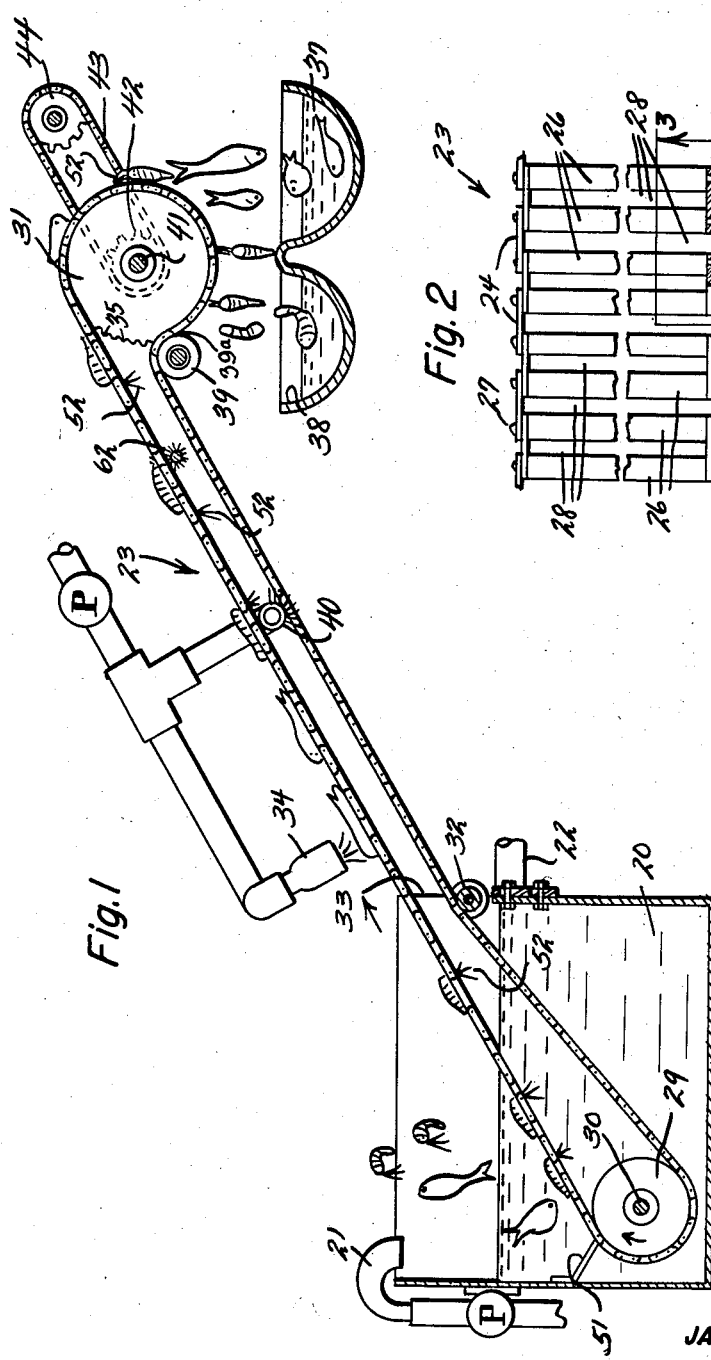
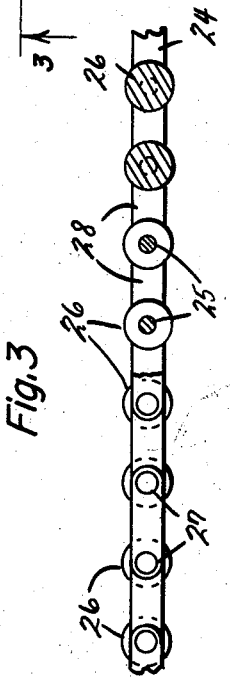
INVENTOR
JAMES M. LAPEYRE
BY Wilkinson & MawKinney
ATTORNEYS

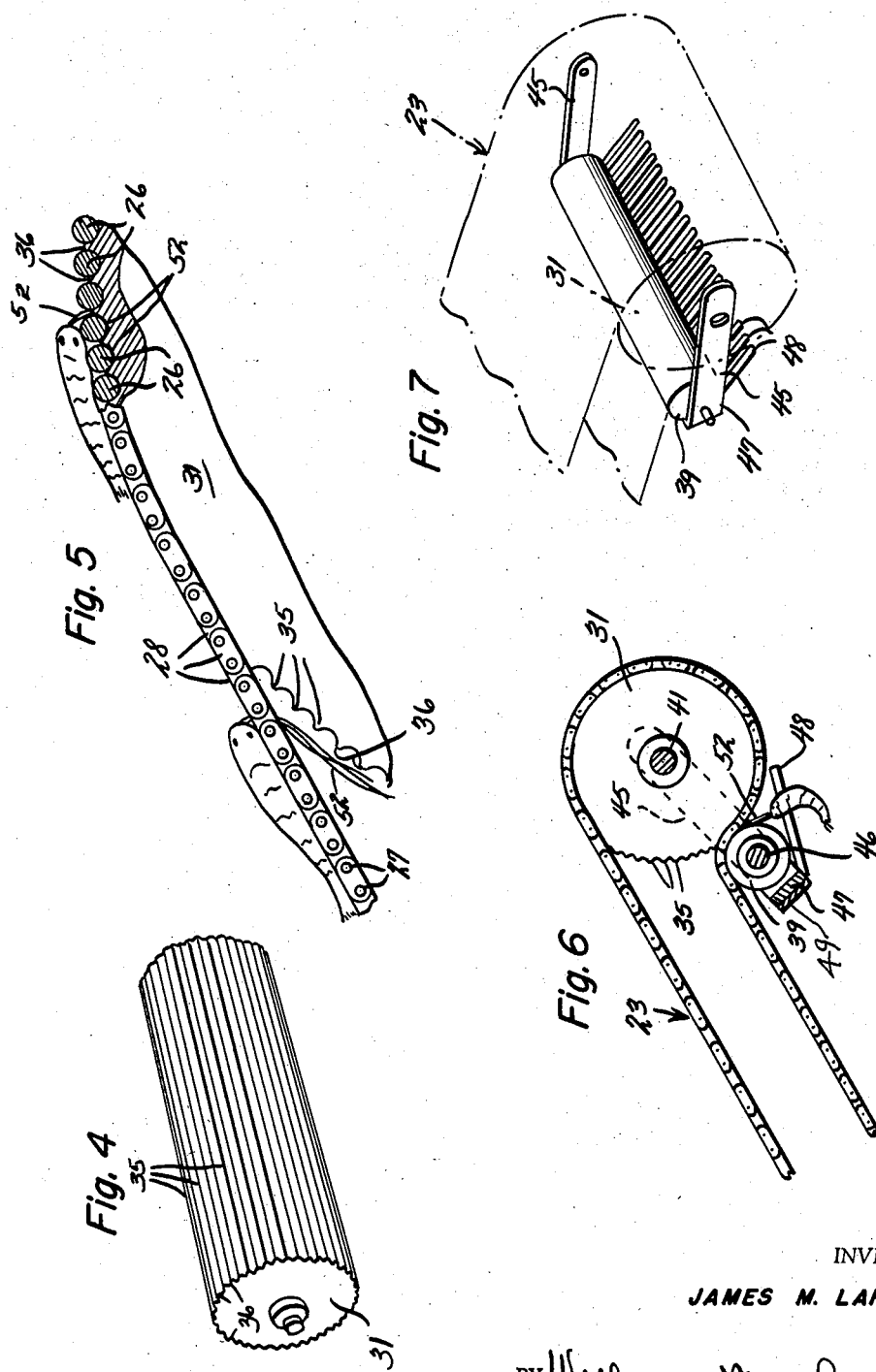

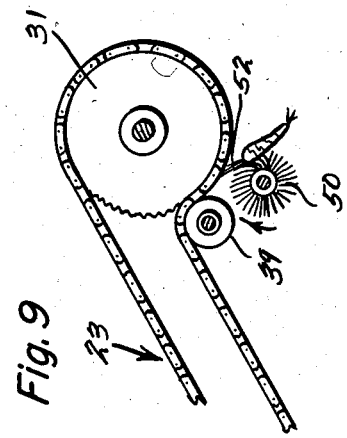
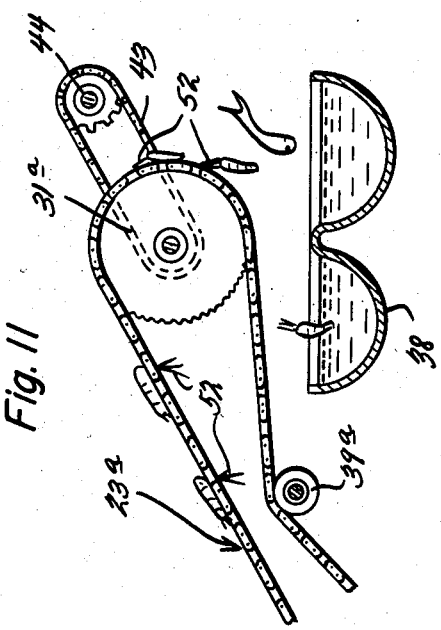
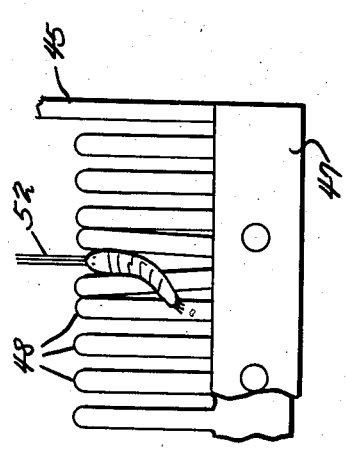
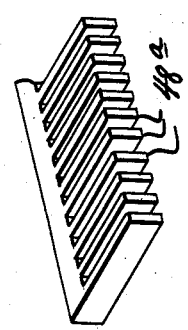

United States Patent Office 2,888,709
Patented June 2, 1959

2,888,709

MACHINE FOR SEPARATING SHRIMP FROM FISH AND DE-HEADING THE SHRIMP

James M. Lapeyre, New Orleans, La., assignor to The Peelers Company, Houma, La., a partnership of Louisiana Application March 23, 1955, Serial No. 496,110

15 Claims. (Cl. 17—2)

The present invention relates to a machine for separating shrimp from fish and de-heading the shrimp and has for an object a machine adapted to receive the promiscuous catch of fish and shrimp and to deliver the fish and shrimp to separate destinations, at the same time de-heading the shrimp, if desired.

Another object of the invention is to provide a machine, in a slightly modified form, which will perform the operation of separating the shrimp from the fish but avoids the de-heading operation for a subsequent step in preparing the shrimp meat for the market.

It is a further object of the invention to provide a machine which separates shrimp from fish in a novel manner by liberating the fish at the discharge end of the machine while entraining the shrimp by binding its whiskers to the active part of the machine and to only liberate the same when the shrimp have progressed to a point beyond that of the point of discharge of the fish.

It is a still further object of the invention to provide a machine of the character above described in which the entrained whiskers of the shrimp are arranged to pull the heads of the shrimp into a pressure device by which the heads may be pinched from the bodies of the shrimp, allowing the shrimp to fall into a receptacle or trough at a point separated from the destination to which the fish are consigned.

It is also within the contemplation of the invention to provide a shrimp de-heading machine in which provision is made for arresting the movement of the body of the shirmp while the entrained whiskers tend to pull the head from the body incident to the continuous movement of a conveyor by which the shrimp are moved to the point of de-heading and discharge.

Other objects of the invention include novel forms of combs and rotary brushes, as well as a novel form of conveyor and toothed drum for co-operating therewith and other incidental novel features contributing to the separation of shrimp from fish and, if desired, the de-heading operation upon the shrimp.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view, with parts broken away and parts shown in section, of a machine for separating shrimp from fish and de-heading the shrimp according to the present invention.

Figure 2 is a fragmentary plan view of a form of conveyor employed.

Figure 2–A is a similar view showing a modified form of conveyor.

Figure 3 is a sectional view taken on the line 3—3 of Figure 2.

Figure 4 is a perspective view of a form of upper drum.

Figure 5 is an end elevational view of the upper drum taken on an enlarged scale with parts broken away and illustrating the inter-engagement of the drum teeth with the slots of a conveyor and indicating the action by which the whiskers of the shrimp are entrained between the drum and conveyor.

Figure 6 is a fragmentary side elevational view of a form of comb in connection with the upper drum and de-heading roller for holding the shrimp body while the head is pulled therefrom.

Figure 7 is a fragmentary perspective view of the upper drum, de-heading roller and a form of comb which may be employed in connection with the invention.

Figure 8 is a plan view of the teeth of the comb showing the action thereof when engaging a shrimp body.

Figure 9 is a view similar to Figure 6 but showing a modified form in which a rotary comb or brush may supplant the fixed comb of Figures 6, 7 and 8.

Figure 10 is a fragmentary perspective view showing an alternate form of tooth for the comb.

Figure 11 is a fragmentary side elevational view, with parts broken away and parts shown in section, of a modified form of the invention which omits the de-heading operation and which illustrates the separating action of the shrimp from the fish.

Referring more particularly to the drawings, 20 designates a tank into which sea water or other water or desired liquid may be introduced through a water supply 21 up to a constant liquid level determined by a water overflow or discharge 22.

The lower end of an endless conveyor 23 extends diagonally through the tank 20 with its upper run arranged to move upwardly and outwardly of the tank and to receive in an endless cycle both fish and shrimp.

As shown more particularly in Figure 2, the conveyor 23 may comprise overlapped side links 24 at each side of the conveyor pivoted together by the trunnions 25 of rods or rollers 26. The trunnions 25 are of reduced diameter compared with the rods or rollers 26 and the outer ends of the trunnions 25 are upset, as indicated at 27, on the outer sides of the links 24. The rods or rollers 26 may rotate about the bearings of their trunnions 25 in the side links 24.

The rods or rollers 26 are spaced apart by slots 28 and the lower end of the conveyor 23 may extend about a lower drum or sprockets 29 which may be smooth-surfaced or have teeth for entering the slots or spaces 28 between the rollers 26.

It is not necessary that the rods 26 be round or that they be rotatably mounted. In Figure 2–A an alternate linkage system is shown wherein rods, bars, slats or the like 26ª are not rotatably mounted but together with metal bead spacers 60 which space the members 26ª apart are flexibly connected by wire or cable binders 61 which are threaded through holes in the rods and beads.

The drum 29 is journalled upon a shaft 30 which may be mounted in the side walls of the tank 20 in appropriate bearings.

The upper end of the endless conveyor 23 runs about an upper drum 31 shown more particularly in Figures 4 and 5.

The lower run of the conveyor 23 rides over a guide roller 32 mounted in an end wall of the tank 20 at the base of a slot 33 through which the conveyor 23 moves.

A fluid pressure nozzle 34 in communication with a source of liquid or gas supply, for instance water, is disposed above the upper run of the conveyor 23 and so positioned relatively thereto that it is adapted to direct a stream of fluid pressure upon the rods 26 and more particularly through the slots or spaces 28 between the rods.

Referring more particularly to Figures 4 and 5, the upper drum 31 may be a solid cylindrical body fluted or provided with teeth 35 on its external surface. As more particularly illustrated in Figure 5, the outer edges 36 of the teeth 35 are rounded. As also appears from Figure 5, the teeth 35 are adapted to enter the slots or spaces 28 between the rollers 26 of the endless conveyor 23.

As appears more particularly from Figure 1, a first or fish receptacle 37 and a second or shrimp receptacle 38 are provided beneath the upper drum 31. A de-heading roller 39 is disposed with its axis substantially parallel to the axis of the upper drum 31, such roller 39 being disposed below the lower run of the conveyor 23 in suchwise as to form a bight 39a in the lower run of the conveyor and to require that this lower run of the conveyor pass over a very wide arc on the lower side of the drum 31 before passing over the roller 39 and descending in substantial parallelism with the upper run of the belt down over the guide roller 32 and to the lower drum or sprockets 29.

A second fluid pressure or spray nozzle 40 is mounted intermediate the rollers 32 and 39 between the upper and lower runs of the conveyor 23 in position to direct a jet of liquid or gas, preferably water, upon the rods 26.

As shown more particularly in Figure 1, a shaft 41 is in driving relation with the upper drum 31 and has affixed thereto a sprocket 42 engaged by a chain 43 driven from a second sprocket 44 which itself is driven by an electric motor or other source of drive power.

As appears more particularly in Figure 6, arms 45 supported from the ends of the shaft 41 may support the shaft 46 of the de-heading roller 39. The bracket arms also carry a comb head 47 which may be of rubber or other suitable elastic material having resilient comb teeth 48 projecting out therefrom in a manner to intercept shrimp entrained by the conveyor 23 and passing about the lower side of the upper drum 31. The arms 45 may carry a bracket 49 to removably support the comb 47, 48.

In Figure 8, the comb teeth 48 are shown of a rounded or relatively thick form.

In Figure 10, the comb teeth 48a are thin and flat.

Referring more particularly to Figure 9, a rotary comb or brush 50 is mounted to rotate in the direction indicated by the arrow, that is in a clockwise direction beneath the nip between the drum 31 and roller 39. The teeth of this rotary comb or the bristles of the rotary brush 50 will encounter the shrimp as indicated in Figure 9.

Referring more particularly to Figure 11, the roller 39a has been moved to a point along the lower run of the conveyor 23a remote from the upper drum 31a so that in this case there is no de-heading operation as hereinafter explained.

In Figure 1, a baffle 51 is shown as extending from one end wall of the tank 20 with its free end in juxtaposition to the upper run of the conveyor 23.

In operation, the device is adapted to be mounted upon shipboard and when the nets are hauled inboard, the heterogeneous catches of both fish and shrimp are dumped upon the deck or in the hold and are thereupon shoveled or otherwise introduced into the tank 20 through which sea water or other liquid is running in a continuously changing stream. This motion of the water through the tank 20 from the input 21 to the discharge 22 tends to move the shrimp and fish onto the continuously rising upper run of the conveyor 23. The end of the conveyor in the tank is the receiving end and that running about the drum 31 the discharge end.

The baffle 51 prevents the shrimp or fish in the tank 20 from getting down to the left of the conveyor 23 and sprockets 29. The upper run of the conveyor 23 will cover the area of the tank 20 substantially from side to side so that the shrimp and fish will gravitate to the upper run of the conveyor 23, emerging thereon above the surface of the liquid in the tank 20 and being carried diagonally upward with the conveyor and beneath the jets 34, of which there may be a number if the conveyor 23 is wider than the effective area over which the discharge from one jet would cover. As the fluid from the jet or jets 34 is directed angularly through the upper run of the conveyor 23, it will play upon both fish and shrimp alike. As to the fish, it will be ineffective, but in the case of shrimp having whiskers 52 growing from the heads thereof, these fluid jets 34 will have the effect to drive the whiskers through one of the slots 28 presented thereto. A rotary brush 62 (Figure 1) rotating counterclockwise is located beneath the upper run of the conveyor 23 above the fluid jets 34 and in position so that its bristles wipe beneath the conveyor and through the slots 26 thereof. The purpose of the brush 62 is to further draw down beneath the upper run of the conveyor the shrimp whiskers 52 which have been partially pushed through by the fluid sprays. A stationary brush would also serve the purpose and any type of brush, due to the conveyor motion, would tend to brush back the whiskers in readiness for the upper drum 31. As the shrimp approach the upper drum 31, the inblown whiskers 52 will first encounter the free surface of the drum 31 and be folded thereby backwardly beneath the upper run of the conveyor 23. The whiskers will also encounter the teeth 35 of the drum 31 and as the upper run of the conveyor moves into intermeshing relation with the teeth 35, such teeth will enter the spaces or slots 28 between the rollers 26. In this action, the teeth 35 will act to bind the whiskers 52 about the inner and under portions of the rollers 26 so as to entrain the shrimp in a fixed manner with the complemental teeth 35 and rollers 26 of the conveyor together with the slots 28 thereof. The rounded edges 36 of the teeth 35 are for the purpose of preventing shearing of the whiskers 52.

On the other hand, the fish simply rest upon the upper run of the conveyor 23 and when this run moves about the upper portion of the drum 31, the fish will simply slide off the conveyor and drop by gravity into the receptacle 37 which is positioned substantially below the terminal upper portion of the conveyor 23, which constitutes the discharge end of the conveyor.

However, the shrimp being entrained by the binding of the whiskers 52 between the drum 31 and the conveyor 23, will be carried around the lower half portion of the upper drum 31 until they arrive at a position above the second receptacle 38. At this point, the whiskers 52 precede the heads of the shrimp into the nip between the rollers 31, 39 or more strictly speaking, into the tangent point at which the upwardly moving conveyor first contacts the roller 39. The pressure of the roller 39 against the shrimp head is backed by the mass of the upper drum 31 so that the head of the shrimp, being pulled by the whiskers through this nip, which is constantly narrowing, will be eventually pinched off from the body of the shrimp and the body will therefore drop by gravity into the receptacle 38. The whiskers and shrimp head will pass on through the nip between rollers 31, 39 and over the roller 39 and be carried downwardly by the lower run of the conveyor 23 past the nozzle or nozzles 40 which deliver fluid, preferably liquid, under some pressure angularly through this portion of the conveyor 23 to wash such whiskers and shrimp heads from the conveyor to a point of disposal beneath the intermediate portion of the conveyor 23.

The lower run of the conveyor 23 thus cleansed moves downwardly and over the roller or rollers 32 and back into the tank 20 moving through the body of sea water or other liquid therein and being subjected to a further cleansing action between the roller 32 and the lower drum or sprockets 29. The inner edge of the baffle plate or plates 51 may also act in the capacity of a scraper to remove from the conveyor any foreign substance still adhering thereto as the lower run passes around the upper portion of the drum or lower sprockets 29 and into the upper run of such conveyor.

Pursuant to this mode of operation, the shrimp are separated from the fish and in the same operation the shrimp may be de-headed. While it is not necessary to de-head shrimp before introducing them into the peeling machine, such de-heading does increase the capacity of the peeling machine. The principal advantage of headlessing lies in the fact that de-headed shrimp maintained under refrigeration will keep fresh for much longer periods than whole shrimp.

Where a comb 47, 48 is employed, as illustrated in Figures 6, 7 and 8, the comb teeth 48 will extend into the path of the shrimp pendant from the conveyor. The spaces between the comb teeth 48 will be such that the shrimp is caught therebetween. In order not to mutilate the shrimp and depreciate the meat in the market, such teeth are yieldable as indicated in Figure 8. The teeth will preferably possess resiliency so as to admit of displacement when encountering a shrimp. When displaced, the resilient teeth 48 at opposite sides of the shrimp will react by virtue of the elasticity inherent therein and firmly yet yieldably grip the body of the shrimp, effectively holding the shrimp from further motion while the whiskers and the head are pulled therefrom. The tail of a shrimp, because of the curved characteristic of the shrimp, has a tendency to get caught in the nip, which tendency is counteracted by the resisting action of the comb. When the whiskers and heads are removed the inherent resiliency will tend to restore the comb teeth to normal position thus exerting a squeezing action upon the body of the shrimp, rejecting such body therefrom, and to aid this action the teeth are rounded or have surfaces substantially similar to the contour of the shrimp.

With some types of shrimp the rounded form of comb tooth, as shown in Figure 8, is more desirable, and with other types the flat thin teeth 48ª of Figure 10 are to be preferred.

The fingers 48 or 48ª assist in freeing the shrimp from the comb so that they may gravitationally drop into the receptacle 38. The teeth 48ª in Figure 10 are substantially rigid edgewise or vertically and flexible only laterally or horizontally, whereas the rounded teeth 48 of Figures 6, 7 and 8 are flexible in all directions. The advantage of the teeth 48ª over the teeth 48 lies in the fact that the former will spread sideways to allow entrance of the shrimp but will hold their rigidity in a vertical direction, thereby preventing engagement of the comb with the conveyor belt 23.

In Figure 9, a rotary comb or brush 50 encounters the shrimp and due to the movement of the outer portions of the teeth or bristles in a direction away from the nip between the rollers 31, 39, the tendency will be to hold the shrimp body back from the nip and substantially in a straight line therewith so that a clean break may be made between the head and the body of the shrimp incident to the traction actions in relatively opposite directions created by the clockwise movement of the brush or rotary comb 50 and the counterclockwise rotation of the de-heading roller 39.

In case it is desired to de-head the shrimp in a subsequent operation, the de-heading roller may be moved to the position 39ª of Figure 11, this is sufficiently remote from the upper drum 31ª that the whiskers 52 of the shrimp will be released from the teeth 35 of the upper drum 31ª when the lower run of the conveyor moves away from the lower portion of the drum 31ª and across the space between the upper drum 31ª and the roller 39ª. As soon as the conveyor rollers are released from the teeth 35 of the drum 31ª, the weight of the shrimp will pull the whiskers through the slots 21ª, the whiskers freely running around the cylindrical surfaces of the rollers 26. The shrimp will thus fall into the receptacle 38 with their heads and whiskers intact.

Although I have disclosed herein the best form of the invention known to me at this time, I reserve the right to all such modifications and changes as may come within the scope of the following claims.

What is claimed is:

1. A machine for separating shrimp from fish comprising a conveyor having a discharge end for the indiscriminate transportation of both fish and shrimp from which the fish will be dumped from the discharge end, and fluid pressure means positioned adjacent said conveyor with its fluid pressure directed against the conveyor to urge the shrimp into positive entrainment with the conveyor so that the shrimp are carried beyond the point of discharge of the fish.

2. In a machine for separating shrimp from fish, a conveyor having a discharge end for both the fish and the shrimp from which the fish are released at the discharge end of the conveyor fluid pressure means positioned adjacent said conveyor with its fluid pressure directed against the conveyor to urge the shrimp into positive entrainment with the conveyor to carry the shrimp to a shrimp release point beyond the point of fish release, and means for releasing the shrimp at the shrimp release point.

3. A machine for separating shrimp from fish comprising a conveyor having a discharge end and openings therethrough and adapted to indiscriminately convey the fish and shrimp therealong and for releasing the fish at the discharge end of the conveyor, means positioned relatively to the conveyor for causing the whiskers of the shrimp to move through the openings in the conveyor, and a discharge drum at the discharge end of the conveyor having teeth adapted to fit into the openings in the conveyor and to bind the whiskers between the drum and conveyor whereby the shrimp are carried around the drum to a point spaced from the fish discharge end of the conveyor before being liberated.

4. In a machine for separating shrimp from fish, a conveyor having a discharge end and comprising side links, spaced rollers transversely of the conveyor having trunnions passing through overlapped portions of the side links to pivot the same together, means at an intermediate portion of the upper run of the conveyor for directing a stream of fluid upon the fish and shrimp and for blowing the whiskers of the shrimp through the spaces between the rollers, and means at the discharge end of the conveyor for binding the whiskers of the shrimp to the conveyor whereby to carry the shrimp before release to a point spaced from the point of discharge of the fish.

5. In a machine for separating shrimp from fish, a conveyor having a discharge point, spaced rollers incorporated in said conveyor, means directed against the conveyor for blowing the whiskers of shrimp supported on the conveyor through the spaces between the rollers, and a rotary drum at the discharge end of the conveyor having teeth with rounded edges adapted to initially encounter the whiskers of the shrimp and to fold the same backwardly beneath the upper run of the conveyor and to subsequently force the whiskers up into the spaces between the rollers of the conveyor and thereby to entrain the shrimp to move about the drum to a point separated from the point of discharge of the fish.

6. In a machine for de-heading shrimp, a conveyor having a discharge end, a drum about which the discharge end of the conveyor moves, means between said drum and conveyor for binding the whiskers of the shrimp therebetween for carrying the shrimp around beneath the drum, and a de-heading roller fitted below the lower run of the conveyor and forming a bight therein into which the whiskers draw the heads of the shrimp which are incidentally pinched off allowing the body of the shrimp to drop by gravity.

7. In a machine of the character described comprising an endless conveyor having a discharge end and openings therethrough, a spray device positioned adjacent the conveyor for directing a jet of fluid angularly through the openings of the upper run of the conveyor for driving the whiskers of shrimp through the openings, means at the discharge end of the conveyor having teeth for entering the openings of the conveyor and binding the whiskers therein to cause entrainment of the shrimp around said means to the underside thereof before entering the lower run of the conveyor, means positioned to contact the lower run of the conveyor for pinching the heads from the shrimp whereby the whiskers and the heads are carried into the lower run of the conveyor, and means directed against the conveyor for directing a jet of fluid through and upon the lower run of the conveyor to wash the shrimp heads and whiskers therefrom.

8. In a machine of the character described, an endless conveyor for transporting fish and shrimp having upper and lower runs, a receiving end for fish and shrimp and a discharge end for fish, a tank into which the receiving end of the conveyor is disposed, a baffle projecting from a tank wall to a point above the origin portion of the upper run of the conveyor, means operatively associated with the tank for introducing liquid to the tank at a point above said upper run, means operatively associated with the tank for withdrawing liquid from the tank from a point beneath said upper run of the conveyor, fluid pressure means directed against the conveyor for entraining the whiskers of the shrimp with the conveyor whereby the same will be required to move beyond the discharge end for the fish, and means operatively associated with the conveyor for liberating the shrimp beyond such discharge end.

9. In a machine of the kind described, a conveyor for shrimp, fluid pressure means positioned adjacent the conveyor with its fluid pressure directed against the conveyor for entraining the whiskers of the shrimp to move with the conveyor, spaced resilient teeth disposed in the path of the body of the shrimp and adapted to grasp and hold such body while the whiskers and head are pulled therefrom, said teeth having surfaces substantially similar to the contour of the shrimp whereby when the heads are released, the inherent elasticity of the teeth will exert a squeezing action upon the body of the shrimp rejecting such body therefrom.

10. In a machine of the kind described, an open-work conveyor for shrimp, means directed against the conveyor for blowing the shrimp whiskers through the open-work, a brush beneath the conveyor having bristles extending up through the open-work to also work the whiskers through such open-work, means in contact with the conveyor for entraining the shrimp by their whiskers with the conveyor to move past a discharge station for fish, and means to subsequently discharge the shrimp from such entrainment.

11. A machine for separating shrimp from fish comprising a conveyor having a receiving end for shrimp and fish and discharge end for the fish for transporting the shrimp and fish to the discharge end, and fluid pressure means positioned with its issuing fluid directed against the conveyor for binding the shrimp to the conveyor whereby when passing the discharge end the shrimp will be suspended from the conveyor and carried thereby beyond the point of discharge of the fish.

12. In a machine for separating shrimp from fish, an endless conveyor having openings therein, upper and lower runs, a receiving end for receiving shrimp and fish on the upper run and a discharge end for the fish, a fluid jet so placed relatively to the upper run of the conveyor to blow the whiskers of shrimp through the openings thereof, a brush under the upper run spaced from the jet in the direction of movement of the upper run to comb the whiskers along the lower surface of the upper run, means in contact with the conveyor upper run at a point spaced from the brush in the direction of movement of the upper run to bind the whiskers to the conveyor so that on movement from the upper to the lower run the shrimp will be supported from the conveyor by their entrained whiskers and carried to a point beyond the point of discharge of the fish.

13. In a machine for separating shrimp from fish, a tank for containing a body of liquid, a conveyor having a discharge end and a lower shrimp and fish receiving end disposed within the tank and extending upwardly therein, said conveyor having openings therein, means in communication with the tank for circulating a stream of liquid through the tank for moving the shrimp and fish onto the upper run of the lower end of the conveyor and for flowing the whiskers of the shrimp through the openings in the conveyor, means in contact with the conveyor for causing the shrimp whiskers to become entrained with the conveyor, and means in contact with the conveyor for releasing the shrimp at a point spaced from the discharge end of the conveyor where the fish are released.

14. A machine for separating shrimp from fish comprising a conveyor having a discharge end for the indiscriminate transportation of both fish and shrimp from which the fish will be dumped from the discharge end, and fluid pressure means directed against the conveyor for binding the shrimp to the conveyor to carry the shrimp beyond the point of discharge of the fish, said conveyor comprising the sole means for supporting and transporting the fish and shrimp to the discharge end.

15. A machine for separating shrimp from fish comprising a conveyor having a discharge end and openings therethrough of a size less than the size of the shrimp and fish and adapted to indiscriminately convey the fish and shrimp therealong and for releasing the fish at the discharge end of the conveyor, means directed against the conveyor for causing the whiskers of the shrimp to move through the openings in the conveyor, and a discharge drum at the discharge end of the conveyor having teeth adapted to fit into the openings in the conveyor and to bind the whiskers between the drum and conveyor whereby the shrimp are carried around the drum to a point spaced from the fish discharge end of the conveyor before being liberated.

References Cited in the file of this patent

UNITED STATES PATENTS

| | | |
|---|---|---|
| 931,060 | Hage | Aug. 17, 1909 |
| 1,744,251 | Urschel | Jan. 21, 1930 |
| 2,491,778 | Smith | Dec. 20, 1949 |
| 2,534,767 | Greiner et al. | Dec. 19, 1950 |
| 2,546,414 | Abbott | Mar. 27, 1951 |
| 2,574,044 | Lapeyre et al. | Nov. 6, 1951 |
| 2,663,897 | Greiner et al. | Dec. 29, 1953 |
| 2,668,619 | Wormser et al. | Feb. 9, 1954 |
| 2,714,411 | Aguilar et al. | Aug. 2, 1955 |

FOREIGN PATENTS

| | | |
|---|---|---|
| 531,385 | Germany | Aug. 8, 1931 |
| 629,943 | Great Britain | Sept. 30, 1949 |